(12) United States Patent
Ando

(10) Patent No.: US 10,093,265 B2
(45) Date of Patent: Oct. 9, 2018

(54) KNEE PROTECTING AIR BAG SYSTEM

(71) Applicant: TOYODA GOSEI CO., LTD., Kiyosu-shi, Aichi-ken (JP)

(72) Inventor: Takeshi Ando, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 146 days.

(21) Appl. No.: 15/240,216

(22) Filed: Aug. 18, 2016

(65) Prior Publication Data

US 2017/0057447 A1 Mar. 2, 2017

(30) Foreign Application Priority Data

Aug. 31, 2015 (JP) .................................. 2015-171302

(51) Int. Cl.
| | |
|---|---|
| *B60R 21/206* | (2011.01) |
| *B60R 21/2338* | (2011.01) |
| *B60R 21/233* | (2006.01) |
| *B60R 21/231* | (2011.01) |

(52) U.S. Cl.
CPC .......... *B60R 21/206* (2013.01); *B60R 21/231* (2013.01); *B60R 21/233* (2013.01); *B60R 21/2338* (2013.01); *B60R 2021/23169* (2013.01); *B60R 2021/23324* (2013.01); *B60R 2021/23382* (2013.01)

(58) Field of Classification Search
CPC .............. B60R 21/206; B60R 21/2338; B60R 2021/23169; B60R 2021/23382
See application file for complete search history.

(56) References Cited

U.S. PATENT DOCUMENTS

| | | | | |
|---|---|---|---|---|
| 5,536,043 A | * | 7/1996 | Lang ..................... | B60R 21/02 280/728.3 |
| 8,998,249 B2 | * | 4/2015 | Tanaka .................. | B60R 21/206 280/729 |
| 9,592,787 B2 | * | 3/2017 | Jung ..................... | B60R 21/206 |

(Continued)

FOREIGN PATENT DOCUMENTS

| | | |
|---|---|---|
| JP | 2002-337642 A | 11/2002 |
| JP | 2004-330959 A | 11/2004 |

(Continued)

OTHER PUBLICATIONS

Office Action dated Jun. 26, 2018 issued in the corresponding JP patent application No. 2015-171302 (and English translation).

*Primary Examiner* — Barry Gooden, Jr.
(74) *Attorney, Agent, or Firm* — Posz Law Group, PLC

(57) ABSTRACT

A knee protecting air bag system includes an air bag, folded to be housed in a housing portion on a lower side of a body side member in front of a seated occupant. The air bag includes thickness controlling tethers that are provided so as to connect an occupant side wall portion and a body side wall portion when the air bag inflates completely. The thickness controlling tethers include an upper tether and a lower tether that are provided to extend into a belt-like shape along a left-to-right direction in upper and lower positions in the lower inflating portion when the air bag inflates completely. An abutment portion is formed between a portion where the upper tether is connected to the body side wall portion and a portion where the lower tether is connected to the body side wall portion.

11 Claims, 12 Drawing Sheets

(56) References Cited

U.S. PATENT DOCUMENTS

| | | | | |
|---|---|---|---|---|
| 9,796,349 | B2* | 10/2017 | Tanaka | B60R 21/206 |
| 2002/0171230 | A1 | 11/2002 | Takimoto et al. | |
| 2006/0076758 | A1 | 4/2006 | Yokoyama | |
| 2007/0222189 | A1* | 9/2007 | Baumbach | B60R 21/231 |
| | | | | 280/730.1 |
| 2007/0246920 | A1* | 10/2007 | Abele | B60R 21/206 |
| | | | | 280/730.1 |
| 2008/0116669 | A1* | 5/2008 | Adachi | B60R 21/203 |
| | | | | 280/730.1 |
| 2011/0109070 | A1* | 5/2011 | Tanaka | B60R 21/206 |
| | | | | 280/741 |
| 2011/0260434 | A1 | 10/2011 | Gottschalk et al. | |
| 2012/0007345 | A1* | 1/2012 | Lee | B60R 21/206 |
| | | | | 280/728.2 |
| 2012/0205898 | A1* | 8/2012 | Picard | B60R 21/2338 |
| | | | | 280/730.1 |
| 2015/0183391 | A1* | 7/2015 | Abele | B60R 21/231 |
| | | | | 280/730.1 |
| 2016/0046253 | A1* | 2/2016 | Jung | B60R 21/206 |
| | | | | 280/729 |
| 2016/0059815 | A1* | 3/2016 | Jung | B60R 21/206 |
| | | | | 280/730.1 |
| 2016/0288758 | A1* | 10/2016 | Ando | B60R 21/206 |

FOREIGN PATENT DOCUMENTS

| | | | |
|---|---|---|---|
| JP | 2005-075143 A | 3/2005 | |
| JP | 2005-343180 A | 12/2005 | |
| JP | 2012-511456 A | 5/2012 | |
| WO | WO-2014163337 A1 * | 10/2014 | B60R 21/206 |

* cited by examiner

KNEE PROTECTING AIR BAG SYSTEM

CROSS-REFERENCE TO RELATED APPLICATION(S)

This application is based upon and claims the benefit of priority from Japanese Patent Application No. 2015-171302, filed on Aug. 31, 2015, the entire contents of which are incorporated herein by reference.

BACKGROUND

1. Field of the Invention

The present invention relates to a knee protecting air bag system in which an air bag housed on a lower side of a body side member such as an instrument panel is inflated so as to protect the knees of an occupant.

2. Description of the Related Art

A conventional knee protecting air bag system includes an air bag that is folded to be housed in a housing portion on a lower side of a body side member such as an instrument panel that lies in front of an occupant seated in a driver's or a front passenger's seat (for example, refer to JP-A-2002-337642 and JP-A-2005-75143). As portions that deploy to inflate towards the rear from the housing portion by introducing inflation gas thereinto, this air bag includes an upper inflating portion that deploys to inflate to an upper side of the housing portion to protect the knees of the occupant and a lower inflating portion that deploys to inflate to a lower side of the housing portion to thereby be disposed at the rear of the body side member. This air bag also has an occupant side wall portion that is disposed on a side facing the occupant and a body side wall portion that is disposed on a side facing the body side member when the air bag completes its inflation. Additionally, the air bag has a plurality of thickness controlling tethers that connect the occupant side wall portion and the body side wall portion when the air bag completes its inflation.

In the conventional knee protecting air bag system, however, when the upper inflating portion of the air bag deploys to inflate upwards from the housing portion as a result of the air bag system being activated, although the thickness of the air bag is controlled by the tethers, in case the air bag deploys to inflate while being spaced apart to the rear from the body side member, the air bag has difficulty in entering a narrow space defined between the knees of the occupant and the body side member.

SUMMARY

The invention has been made to solve the problem described above, and an object thereof is to provide a knee protecting air bag system in which an air bag can deploy to inflate along a rear surface side of a body side member when the air bag system is activated to operate.

According to a first aspect of the invention, there is provided a knee protecting air bag system including: an air bag that is folded to be housed in a housing portion on a lower side of a body side member in front of a seated occupant, the air bag including: an occupant side wall portion that is disposed on a side facing the occupant and a body side wall portion that is disposed on a side facing the body side member when the air bag deploys to inflate to the rear from the housing portion by inflation gas being caused to flow thereinto; an upper inflating portion that deploys to inflate on an upper side of the housing portion so as to protect knees of the occupant; a lower inflating portion that is disposed at the rear of the body side member on a lower side of the housing portion; a mounting portion that is provided on a lower side of the body side wall portion so as to be mounted in the housing portion; and a plurality of thickness controlling tethers that are provided so as to connect the occupant side wall portion and the body side wall portion when the air bag inflates completely, wherein: the plurality of thickness controlling tethers includes upper tether and a lower tether that are provided to extend into a belt-like shape along a left-to-right direction in an upper and lower positions in the lower inflating portion when the air bag inflates completely and which are connected to the body side wall portion at front end sides and are connected to the occupant side wall portion at rear end sides thereof; and an abutment portion that is formed between a portion where the upper tether is connected to the body side wall portion and a portion where the lower tether is connected to the body side wall portion so as not only to project to the front when the air bag inflates completely but also to be brought into abutment with a rear surface of the body side member to thereby restrain an upper end side of the upper inflating portion from moving to the rear when the air bag inflates completely.

In the knee protecting air bag system of the invention, when the air bag deploys to inflate, the abutment portion on the body side wall portion on the lower side of the air bag that is disposed between the upper tether and the lower tether projects to the front and is then brought into abutment with the body side member to thereby restrain the upper end side of the upper inflating portion of the air bag from moving to the rear. Thus, the upper inflating portion of the air bag deploys and inflates along the lower surface of the body side member to a maximum extent.

Namely, with this air bag, it is possible to ensure the configuration in which the mounting portion of the air bag that is mounted in the case makes up a fulcrum, the abutment portion of the lower inflating portion of the air bag makes up a point of application which presses the body side member, and the upper inflating portion of the air bag applies a thrusting force to the front at the upper end side thereof acting as a point of action. Owing to this, the upper inflating portion of the air bag rises along the rear surface of the body side member to a maximum extent and can enter the space between the knees of the occupant and the body side member smoothly even though the space is narrow. In addition, since the upper inflating portion of the air bag can deploy to inflate along the rear surface of the body side member, even in the event that the upper inflating portion comes to bear the knees after it inflates completely, the upper inflating portion that is in contact with the body side member can ensure the reaction force quickly to protect the knees.

Consequently, in the knee protecting air bag system of the invention, when activated, the air bag is allowed to deploy to inflate along the rear surface of the body side member, and even though the space between the knees of the occupant and the body side member is narrow, the air bag is allowed to enter the narrow space smoothly, whereby the knees can be protected by the upper inflating portion that ensures the reaction force quickly after it inflates completely.

A second aspect of the invention provides the knee protecting air bag system according to the first aspect, wherein the upper tether and the lower tether of the air bag are provided so that a lengthwise dimension of the body side wall portion between a portion where the upper tether is connected to the body side wall and a portion where the lower tether is connected to the body side wall portion is longer than a lengthwise dimension of the occupant side wall portion between a portion where the upper tether is connected to the occupant side wall portion and a portion where the lower tether is connected to the occupant side wall portion.

By adopting the configuration described above, the abutment portion can easily ensure the projecting amount to the front towards the body side member by the difference in length between the fabric portion where the upper tether and the lower tether are connected to the occupant side wall portion and the fabric portion where the upper tether and the lower tether are connected to the body side wall portion, whereby the upper inflating portion of the air bag is allowed to deploy to inflate along the rear surface of the body side member.

A third aspect of the invention provides the knee protecting air bag system according to the second aspect, wherein the upper tether and the lower tether of the air bag are provided so that a portion where the upper tether is connected to the occupant side wall portion coincides with a portion where the lower tether is connected to the occupant side wall portion.

In this configuration, the difference in length between the fabric portion where the upper tether is connected to the occupant side wall portion and the fabric portion where the lower tether is connected to the occupant side wall portion can be ensured to the maximum extent, whereby a maximum projecting amount of the abutment portion can be ensured.

A fourth aspect of the invention provides the knee protecting air bag system according to any one of the first, second and third aspects, wherein the lower tether of the air bag is provided so that in relation to lengths from a boundary portion between the body side wall portion and the occupant side wall portion which lies on a lower edge side of the air bag when the air bag inflates completely to portions where the lower tether is connected to the body side wall portion and the occupant side wall portion, a length on the side of the occupant side wall portion is longer than a length on the side of the body side wall portion.

In this configuration, since the length of the side of the occupant side wall portion is longer than the length of the side of the body side wall portion that lies between the lower tether and the lower edge, a tensile force that attempts to extend upwards from the boundary portion when the air bag inflates completely becomes greater on the side of the occupant side wall portion than on the side of the body side wall portion, whereby an action to push forwards the upper end side of the upper inflating portion of the air bag can be promoted, and this makes it easier for the upper inflating portion of the air bag to deploy to inflate along the rear surface of the body side wall portion. Thus, even though the space between the body side member and the knees of the occupant is narrow, the upper inflating portion of the air bag can enter the narrow space smoothly.

A fifth aspect of the invention provides the knee protecting air bag system according to any one of the first, second and third aspects, wherein the lower tether of the air bag is provided so that the portion where the lower tether is connected to the body side wall portion coincides with the boundary portion between the body side wall portion and the occupant side wall portion which lies on the lower edge side of the air bag when the air bag inflates completely.

In this configuration, a portion that inflates freely does not exist below the lower tether on the body side wall portion, and the tensile force attempting to extend upwards from the boundary portion that is produced when the air bag below the lower tether inflates can be ensured only by the side of the occupant side wall portion. Thus, the force attempting to push the upper end side of the upper inflating portion of the air bag to the front is ensured easily in a stable fashion.

A sixth aspect of the invention provides the knee protecting air bag system according to any one of the first, second, third, fourth and fifth aspects, wherein the upper tether and the lower tether of the air bag are provided so that the upper tether and the lower tether each have an opening through which inflation gas can pass and that the upper tether and the lower tether are connected to an inner circumferential side of the air bag along full circumferences of outer circumferential edges thereof.

In the configuration described above, in case the two chambers (the chamber between the upper tether and the lower chamber and the chamber of the lower edge side of the air bag than the lower tether) on the lower side of the air bag inflate, the internal pressures in the two chambers are increased, whereby the two chambers become rigid bodies, whereby the abutment portion can be brought into abutment with the body side member for stable support, and the upper end side of the upper inflating portion of the air bag is allowed to deploy and inflate along the rear surface of the body side member in a stable fashion.

A seventh aspect of the invention provides the knee protecting air bag system according to any one of the first, second, third, fourth, fifth and sixth aspects, wherein the body side wall portion of the air bag is formed so that in relation to a lengthwise dimension between a portion where the upper tether is connected to the body side wall portion and a portion where the lower tether is connected to the body side wall portion, a central portion in a left-to-right direction is longer than left and right edge sides.

In the configuration described above, the body side wall portion between the upper tether and the lower tether can be ensured so long that the substantial vertical lengthwise dimension of the transversely central portion (the length of the fabric portion) becomes longer to be looser than those of the left and right edge portions, whereby when the lower inflating portion of the air bag inflates, the abutment portion is allowed to project to the front in a more stable fashion.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Hereinafter, an embodiment of the invention will be described based on the drawings. In the embodiment, as shown in FIG. 1, a knee protecting air bag system S will be described as being disposed in front of a driver's seat.

Figure 1:
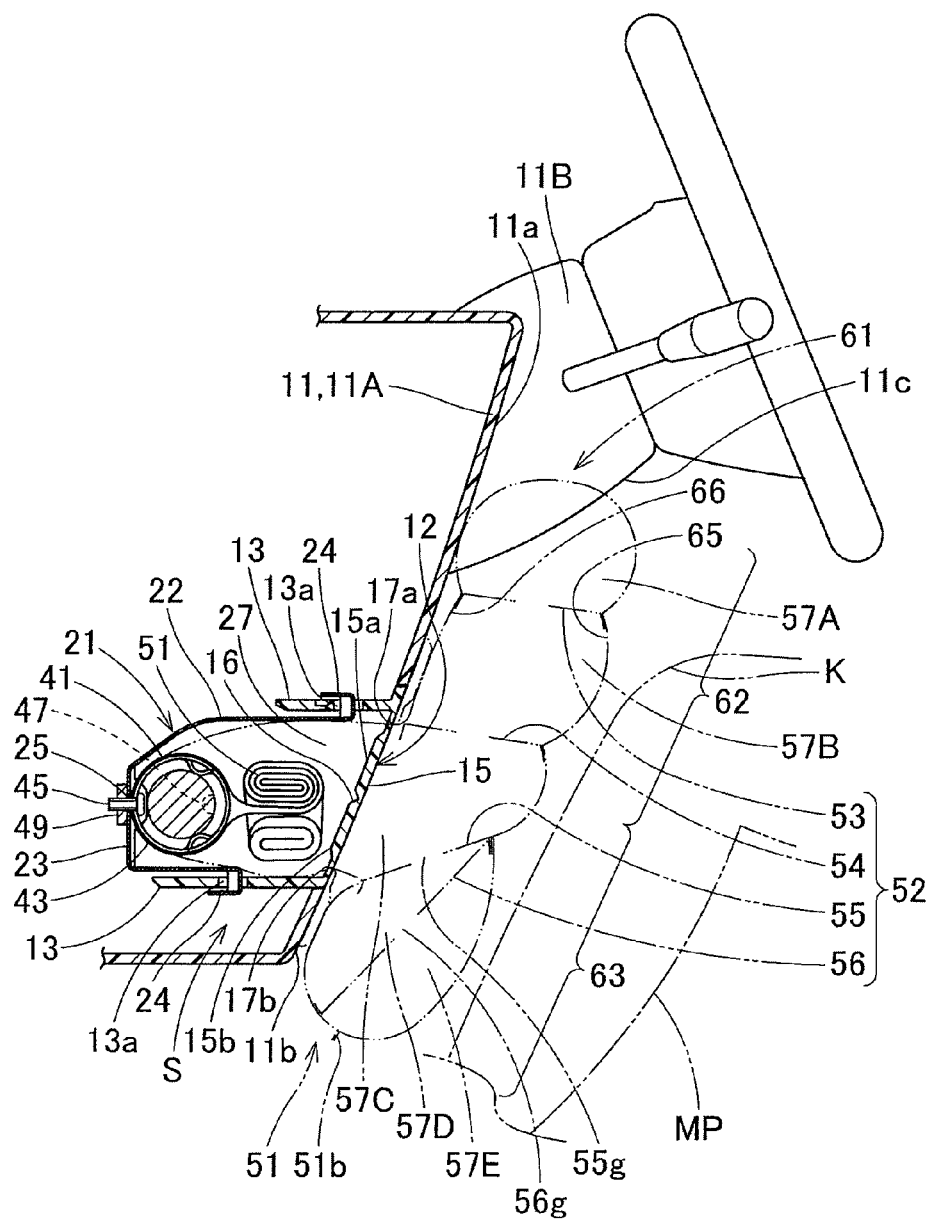
FIG. 1 is a schematic vertical sectional view taken along a front-to-rear direction of a vehicle showing a knee protecting air bag system according to one embodiment of the invention.

As shown in FIG. 1, the knee protecting air bag system S of this embodiment is disposed on a lower side 11b of an instrument panel 11A that is a body side member 11 disposed in front of the driver's seat, and a column cover 11B is disposed on an upper side 11a of the instrument panel 11A. The knee protecting air bag system S includes a folded air bag 51, an inflator 41 that supplies the air bag 51 with inflation gas, a case 21 as a housing portion where the folded air bag 51 and the inflator 41 are housed, and an air bag cover 12 that covers an air bag projecting opening 27 of the case 21.

When referred to in this specification, unless otherwise described, an up-to-down direction, a left-to-right direction and a front-to-rear direction coincide with an up-to-down direction, a left-to-right direction and a front-to-rear direction of a vehicle on which the knee protecting air bag system S is mounted.

The case 21 as the housing portion is, as shown in FIG. 1, disposed on a lower side 11b of the instrument panel 11A in front of knees K of an occupant (in the case of the illustrated example, specifically speaking, the occupant is a driver, however, in this patent application, the occupant includes the driver and a front seat passenger.) MP. The case 21 is formed of a sheet of metal into a substantially quadrangular box shape to house the folded air bag 51. In the case of this embodiment, the case 21 houses the air bag 51 together with the inflator 41. The case 21 includes a substantially quadrangular cylindrical circumferential wall portion 22 that is opened on a rear side facing the rear of the vehicle as the air bag projecting opening 27 and a substantially rectangular bottom wall portion 23 that closes a front side, facing the front of the vehicle, of the circumferential wall portion 22. A plurality of locking claw portions 24 are formed along a left-to-right direction individually on upper and lower edge portions of a circumferential edge of the air bag projecting opening 27 of the circumferential wall portion 22, and these locking claw portions 24 are locked individually on circumferential edges of locking hole portions 13a in a mounting wall portion 13, which will be described later, of the air bag cover 12. A plurality of mounting holes 25 for fixedly mounting the inflator 41 are formed in the bottom wall portion 23. Further, an opening, not shown, is formed in the circumferential wall portion 22 of the case 21 from which a connecting portion side end portion of the inflator 41 is exposed. The case 21 is connected and fixed to an instrument panel reinforcement of the vehicle by making use of a bracket, not shown.

Figure 9:
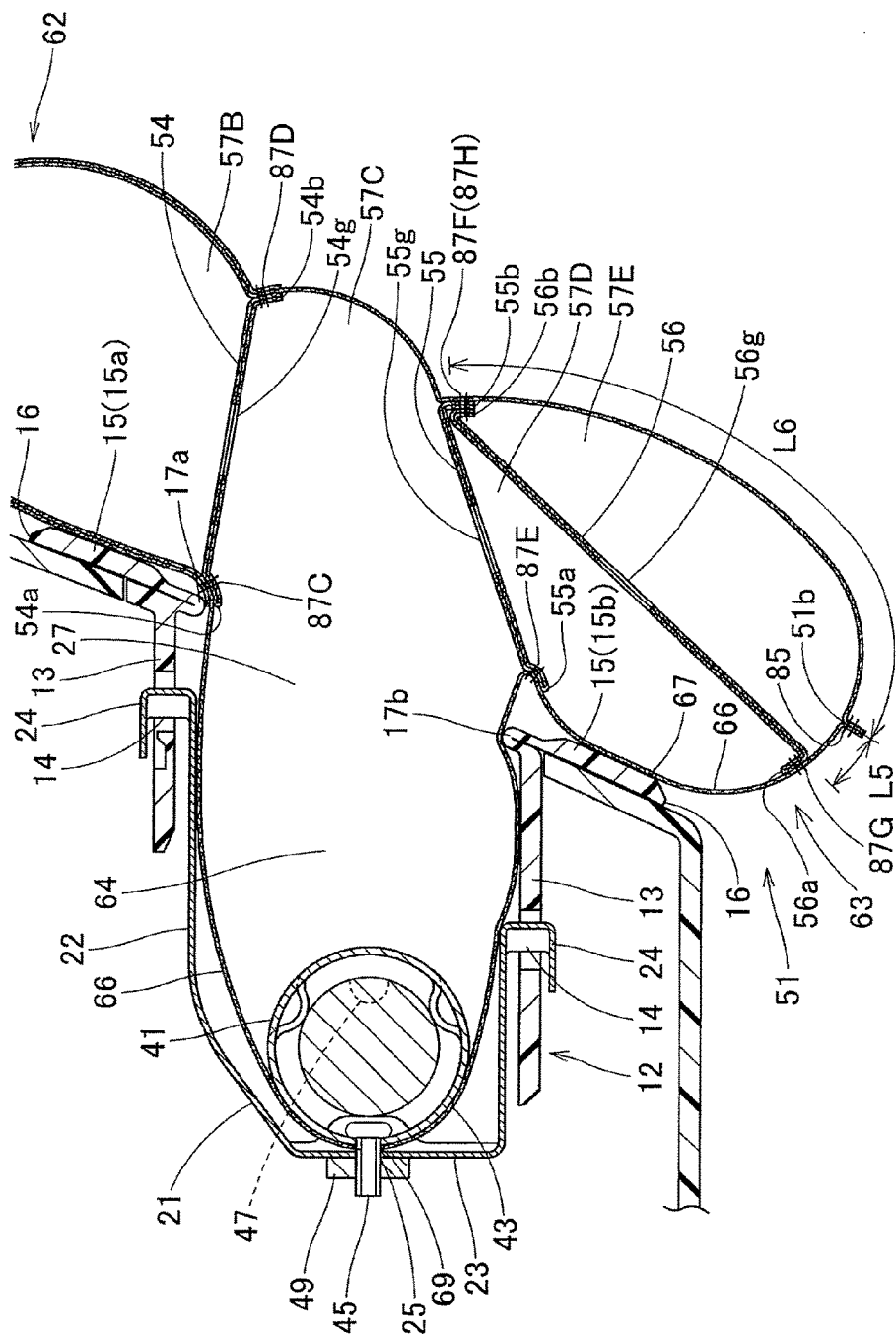
FIG. 9 is a schematic vertical sectional view of the knee protecting air bag system of the embodiment taken along the front-to-rear direction of the vehicle and showing a state in which the air bag completes its inflation at the end of the inflating operation and is more particularly a partial enlarged view showing a portion of the air bag where the lower inflating portion is provided.

As shown in FIGS. 1, 9, the air bag cover 12 covers a rear side, facing the rear of the vehicle, of the folded air bag 51 and also serves as a body side member 11 together with the instrument panel 11A. A substantially rectangular plate-like door portion 15 is formed on the air bag cover 12 in a position where the air bag projecting opening 27 of the case 21 is disposed. The door portion 15 is designed to be opened upwards and downwards into a passenger compartment when pushed by the air bag 51 which is deploying to inflate. A thin rupture planned portion, having an H shape when viewed from the passenger compartment side, is provided on the periphery of the door portion 15, and hinge portions 17 each including an integral hinge are provided on an upper edge and a lower edge of the door portion 15. When the air bag 51 deploys to inflate, the door portion 15 is pushed by the air bag 51 to break a portion to be broken 16, and is then divided into an upper door portion 15a and a lower door portion 15b. The upper door portion 15a opens upwards into the passenger compartment side on an upper hinge portion 17a as a rotational center when it opens. The lower door portion 15b opens downwards into the passenger compartment side on a lower hinge portion 17b as a rotational center when it opens. The air bag cover 12 includes the mounting wall portion that extends to the front from the circumference of the door portion 15. The locking hole portions 13a are formed in the mounting wall portion 13 so that the locking claw portions 24 on the case 21 are locked therein.

In the case of this embodiment, the inflator 41 includes, as shown in FIGS. 1, 9, a main body portion 43 having a substantially cylindrical external shape and mounting bolts 45 functioning as mounting devices which are disposed so as to project from an outer circumferential surface of the main body portion 43 in a direction which is at right angles to an axis of the main body portion 43. The main body portion 43 includes a gas outlet port 47 through which inflation gas can be let out. The main body portion 43 includes a connecting opening portion that is disposed at one end thereof, and a connector to which a lead wire extending from an air bag activation circuit, not shown, is connected to this connecting opening portion. The inflator 41 of this embodiment is inserted in to the air bag 51 from an inserting hole 70, which will be described later, of the air bag 51 in such a way that a connecting opening portion side end portion is exposed and is then housed inside the air bag 51 with the mounting bolts 45 caused to project from mounting holes 69, which will be described later, of the air bag 51.

The air bag 51 is formed of a flexible woven fabric made of polyester or polyamide fibers and is designed to be inflated into a bag-like shape by inflation gas being introduced into an interior thereof. When deploying to inflate, the air bag 51 projects out of the case 21 and inflates from the lower side 11b towards the upper side 11a of the instrument panel 11A until it reaches a rear surface (a lower surface) 11c of the column cover 11B as the body side member 11 so as to enter a narrow space defined between the knees K of the occupant MP seated in the driver's seat and the instrument panel 11A. When completing its inflation, the air bag 51 is designed to be disposed along the instrument panel 11A acting as the body side member 11 and the rear surface 11c of the column cover 11B also acting as the body side member 11 in front of the knees K of the occupant MP as indicated by chain double-dashed lines in FIG. 1 and in FIG. 8.

As shown in FIGS. 2, 3, 4, 8, the air bag 51 has an inflating portion 61 that deploys to inflate so as to protect the knees K of the occupant MP, and this inflating portion 61 includes an upper inflating portion 62 and a lower inflating portion 63. The upper inflating portion 62 functions as a knee protecting portion and deploys to inflate into a substantially rectangular plate-like shape on the upper side of the case 21. The lower inflating portion 63 deploys to inflate into a substantially trapezoidal plate-like shape that tapers downwards on the lower side of the case 21. The upper inflating portion 62 becomes laterally wider than the case 21 so as to protect the left and right knees K of the occupant MP. In the case of this embodiment, the circumferential wall 60 of the air bag 51 has an occupant side wall portion 65 and a body side wall portion 66. The occupant side wall portion 65 is disposed on a side facing the occupant MP when it inflates completely, and the body side wall portion 66 is disposed on a side facing the body side member 11 when it inflates completely. The occupant side wall portion 65 and the body side wall portion 66 have external shapes that substantially coincide with each other. A stitched portion 85 is provided on the air bag 51 where a circumferential edge of the occupant side wall portion 65 and a circumferential edge of the body side wall portion 66 are joined together with stitches, whereby the air bag 51 is made into the bag-like shape (refer to FIGS. 2 to 5).

As shown in FIG. 9, an area that lines near the mounting holes 69 in the body side wall portion 66 of the air bag 51 represents a mounting portion 64. The two mounting holes 69 through which the mounting bolts 45 of the inflator 41 can be inserted and the inserting hole 70 through which the inflator 41 can be inserted are formed in a portion of the mounting portion 64 that the body side wall portion 66 occupies, as shown in FIG. 3.

A plurality of tethers 52 are provided inside the air bag 51. The tethers 52 connect the occupant side wall portion 65 and the body side wall portion 66 together so as to control a spacing distance between the occupant side wall portion 65 and the body side wall portion 66 (or to control the thickness of the air bag 51) when the air bag 51 inflates.

Figure 2:
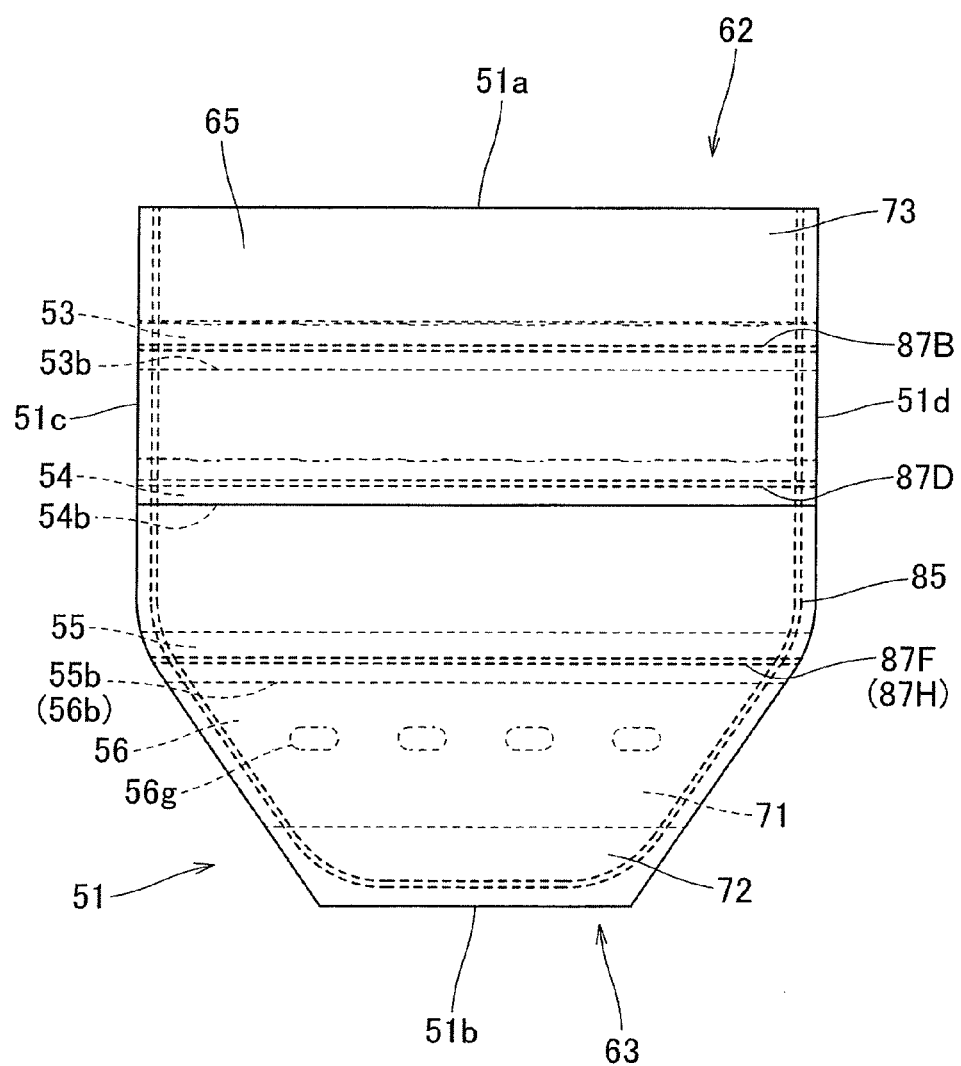
FIG. 2 is a front view of an air bag used in the knee protecting air bag system of the embodiment showing a state in which the air bag used is deployed flat.
Figure 3:
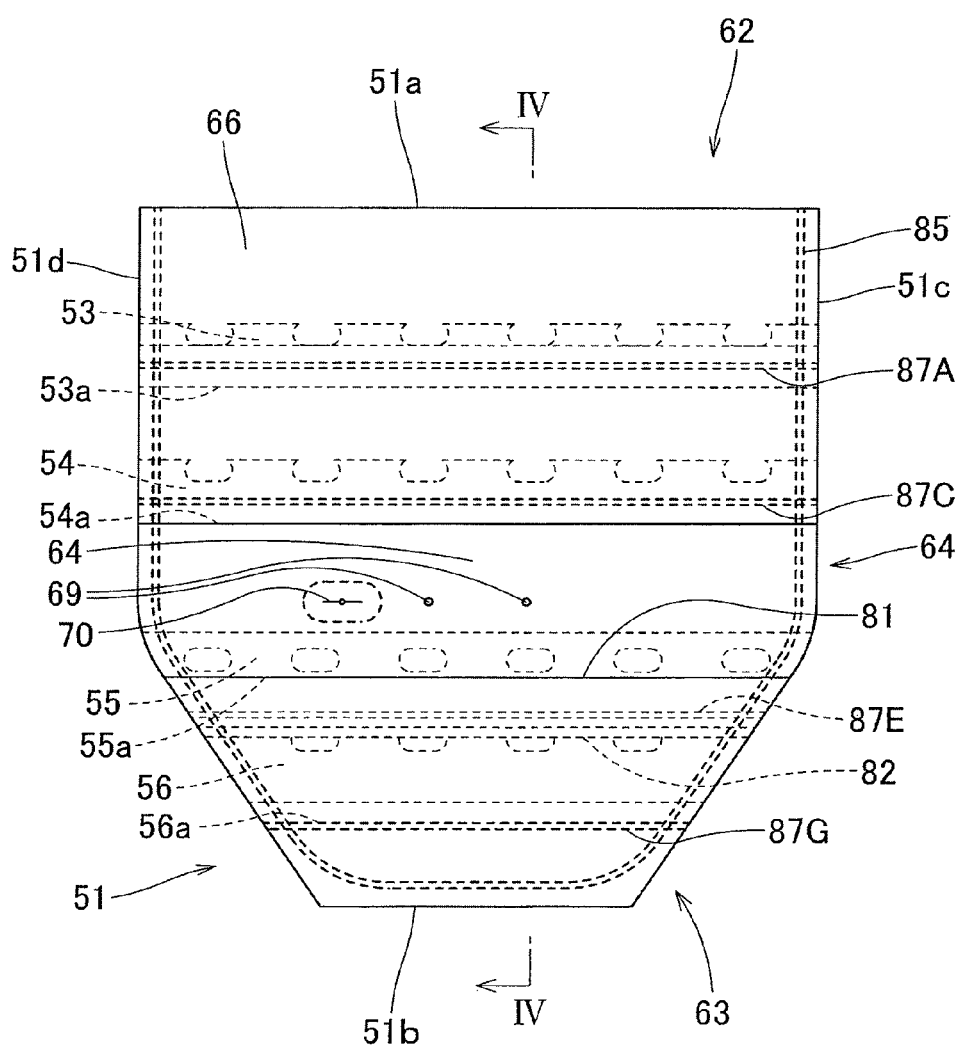
FIG. 3 is a rear view of the air bag shown in FIG. 2.
Figure 4:
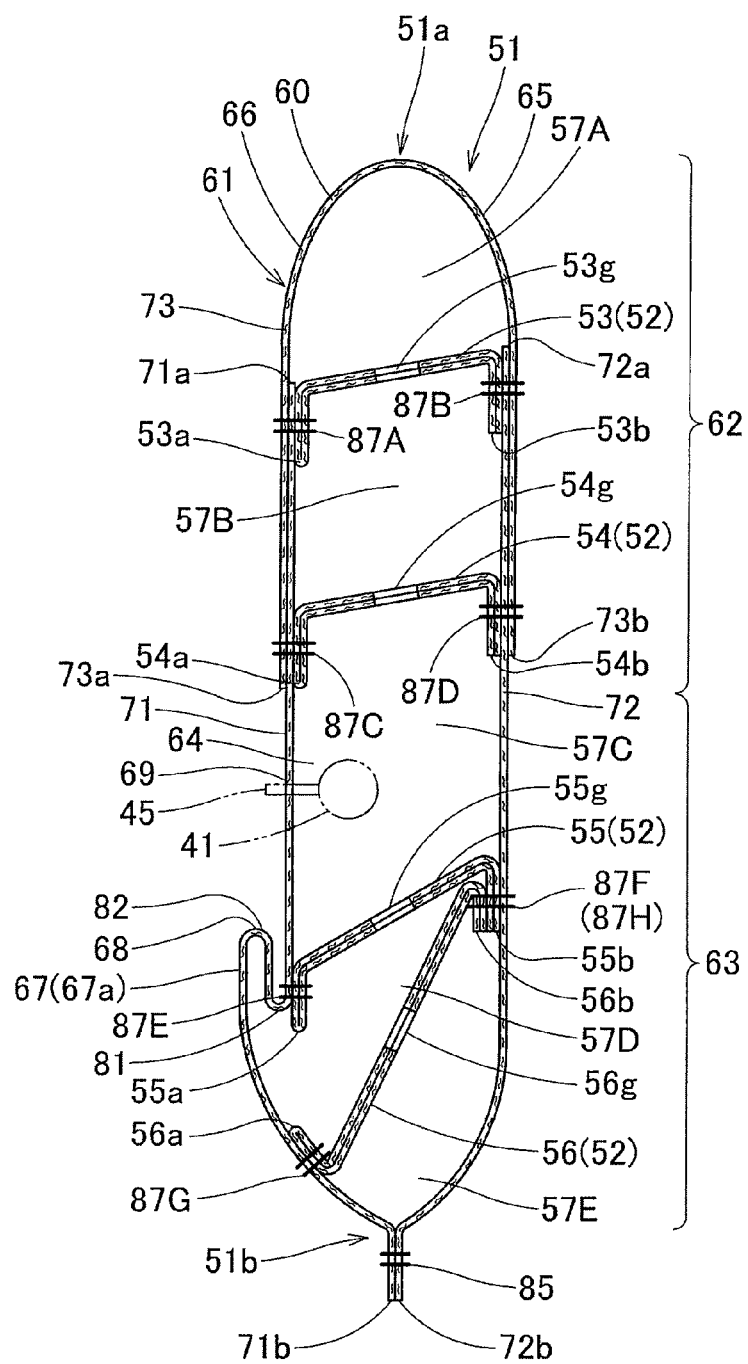
FIG. 4 is a schematic vertical sectional view of the air bag shown in FIG. 3 showing a portion taken along a line IV-IV in FIG. 3.
Figure 7:
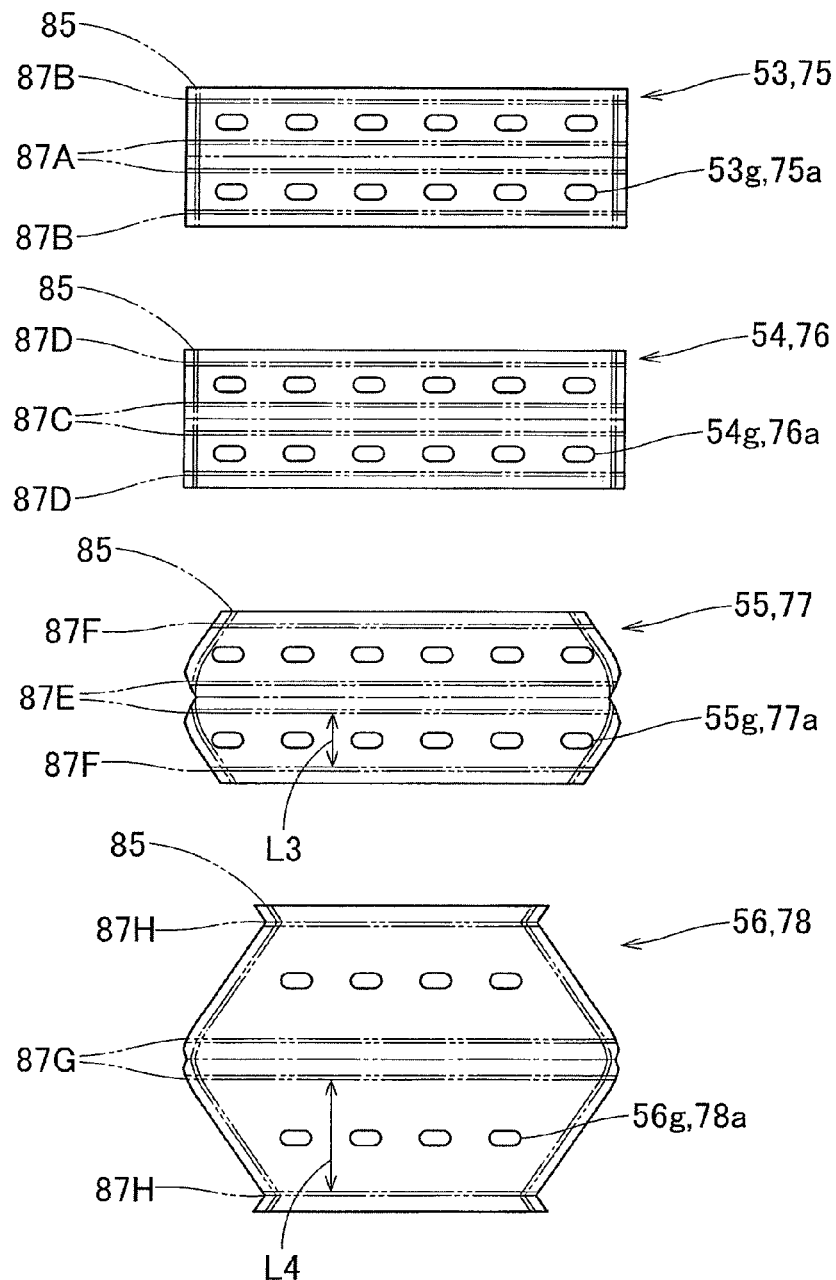
FIG. 7 is a plan view showing tether base fabrics making up tethers that are disposed in the air bag shown in FIG. 3.
Figure 8:
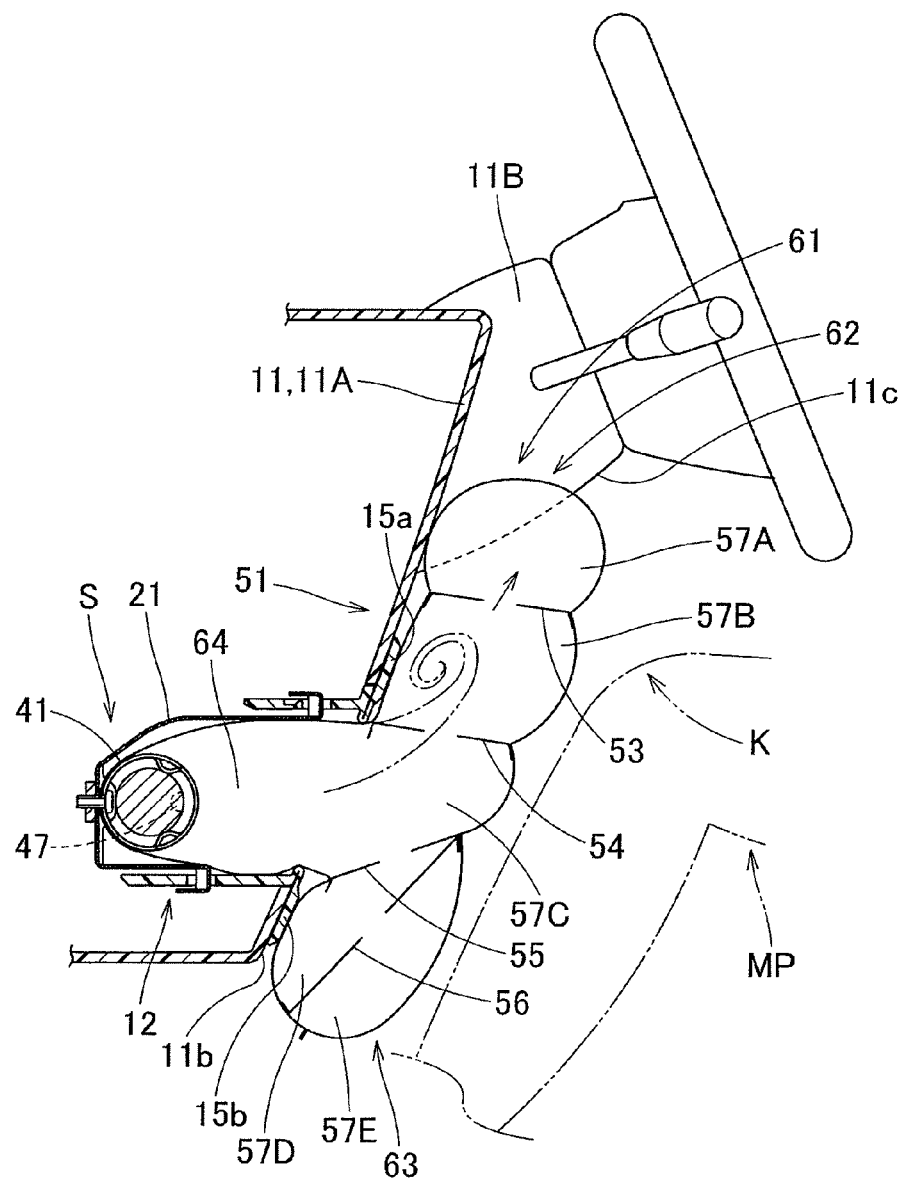
FIG. 8 is a schematic vertical sectional view of the knee protecting air bag system of the embodiment taken along the front-to-rear direction of the vehicle and showing a state in which the air bag completes its inflation at the end of an inflating operation.

In the case of this embodiment, as shown in FIGS. 2, 3, 4, two tethers 53, 54 are provided in the upper inflating portion 62 of the air bag 51 as the tethers 52. The tethers 53, 54 are belts-like members that are disposed along a left-to-right direction. In the tethers 53, 54, sides along front edges 53a, 54a, which are one of transverse sides thereof, are joined to the body side wall portion 66 over almost full lengths thereof, while sides along rear edges 53b, 54b, which are the other of the transverse sides thereof, are joined to the occupant side wall portion 65 over almost full lengths thereof, whereby the tethers 53 54 are provided laterally or longitudinally over almost the whole area of the upper inflating portion 62. Specifically speaking, in the case of this embodiment, the tethers 53, 54 are disposed so as to extend substantially along a front-to-rear direction as shown in FIG. 8 when the air bag 51 inflates completely. As shown in FIGS. 2, 3, 4, 6, 7, in the tethers 53, 54, the sides along the front edges (front ends) 53a, 54a are securely stitched to the body side wall portion 66 laterally or longitudinally over the full lengths thereof at portions where stitched portions 87A, 87C are formed. Additionally, the sides along the rear edges (rear ends) 53b, 54b are securely stitched to the occupant side wall portion 65 laterally or longitudinally over the full lengths thereof at portions where stitched portions 87B, 87D are formed. To be more specific, in the case of this embodiment, as shown in FIG. 7, the tethers 53, 54 are made by folding substantially belt-shaped tether base fabrics 75, 76 into two in a transverse direction. The tethers 53, 54 are securely stitched to the occupant side wall portion 65 and the body side wall portion 66 along full circumferences of outer circumferential edges thereof with the folded sides of the tether base fabrics 75, 76 that are folded into the two aligned as the front edges 53a, 54a and are then disposed within the air bag 51 (refer to FIG. 4). Pluralities of substantially elliptic gas passage holes 53g, 54g are opened in the tethers 53, 54 side by side along the left-to-right direction in substantially central positions in the front-to-rear direction, so that inflation gas discharged from the inflator 41 is allowed flow therethrough (refer to FIG. 7).

Figure 5:
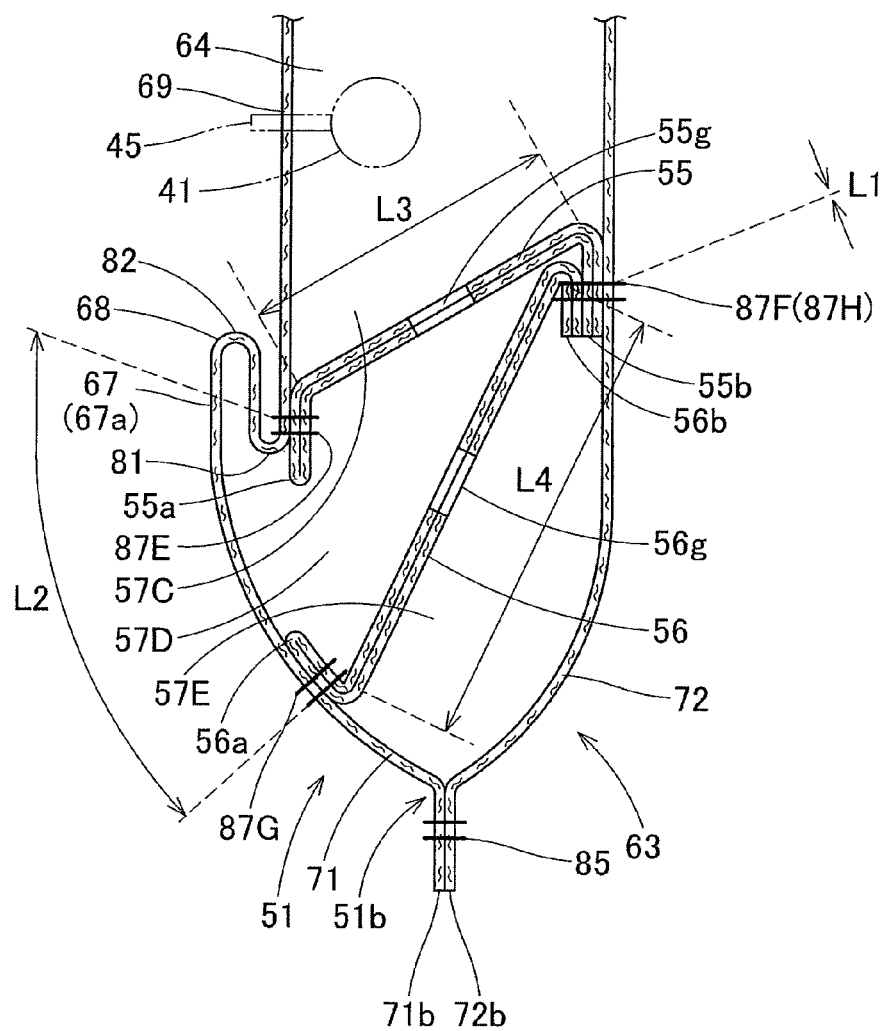
FIG. 5 is a partial enlarged view showing a portion of the air bag where a lower inflating portion is provided.

In the lower inflating portion 63 of the air bag 51, in the case of this embodiment, as shown in FIGS. 2, 3, 4, 5, an upper tether 55 and a lower tether 56 are disposed so as to extend along the left-to-right direction as the tethers 52. As shown in FIGS. 4, 5, 9, in the upper tether 55, a side along a front edge (a front end) 55a is stitched to the body side wall portion 66 to form a stitched portion 87E, and a side facing a rear edge (a rear end) 55b is stitched to the occupant side wall portion 65 to form a stitched portion 87F. More specifically, in the case of this embodiment, as shown in FIG. 7, the upper tether 55 is made by folding a substantially belt-shaped base fabric 77 into two in a transverse direction. The upper tether 55 is securely stitched to the occupant side wall portion 65 and the body side wall portion 66 along a full circumference of an outer circumferential edge thereof with the folded side of the tether base fabric 77 that is folded into the two aligned as the front edges 55a, and is then disposed within the air bag 51 (refer to FIG. 4). As shown in FIGS. 4, 5, 9, in the lower tether 56, a side along a front edge (a front end) 56a is stitched to the body side wall portion 66 to form a stitched portion 87G, and a side facing a rear edge (a rear end) 56b is stitched to the occupant side wall portion 65 to form a stitched portion 87H. More specifically, in the case of this embodiment, as shown in FIG. 7, the lower tether 56 is made by folding a substantially belt-shaped base fabric 78 into two in a transverse direction. The lower tether 56 is securely stitched to the occupant side wall portion 65 and the body side wall portion 66 along a full circumference of an outer circumferential edge thereof with the folded side of the tether base fabric 78 that is folded into the two aligned as the front edges 56a, and is then disposed within the air bag 51 (refer to FIG. 4). In addition, pluralities of substantially elliptic gas passage holes 55g, 56g are opened in the upper tether 55 and the lower tether 56 side by side along the left-to-right direction in substantially central positions in the front-to-rear direction, so that inflation gas discharged from the inflator 41 is allowed flow therethrough (refer to FIG. 7). The upper tether 55 and the lower tether 56 are provided so that a body side wall portion fabric length L2 that is a lengthwise dimension of the body side wall portion 66 between the connected portions to the body side wall portion 66 (between the stitched portion 87E and the stitched portion 87G) becomes longer than an occupant side wall portion fabric length L1 that is a lengthwise dimension of the occupant side wall portion 65 between the connected portions to the occupant side wall portion 65 (between the stitched portion 87F and the stitched portion 87H) (refer to FIGS. 5, 6). In the case of this embodiment, the upper tether 55 and the lower tether 56 are provided so that the connected portions to the occupant side wall portion 65 coincide with each other (the stitched portion 87F=the stitched portion 87H), hence the occupant side wall portion fabric length L1 is zero. In addition, as shown in FIGS. 5, 7, a lengthwise dimension L3 of the upper tether 55 in the front-to-rear direction is shorter than a lengthwise dimension L4 of the lower tether 56 in the front-to-rear direction.

Figure 6:
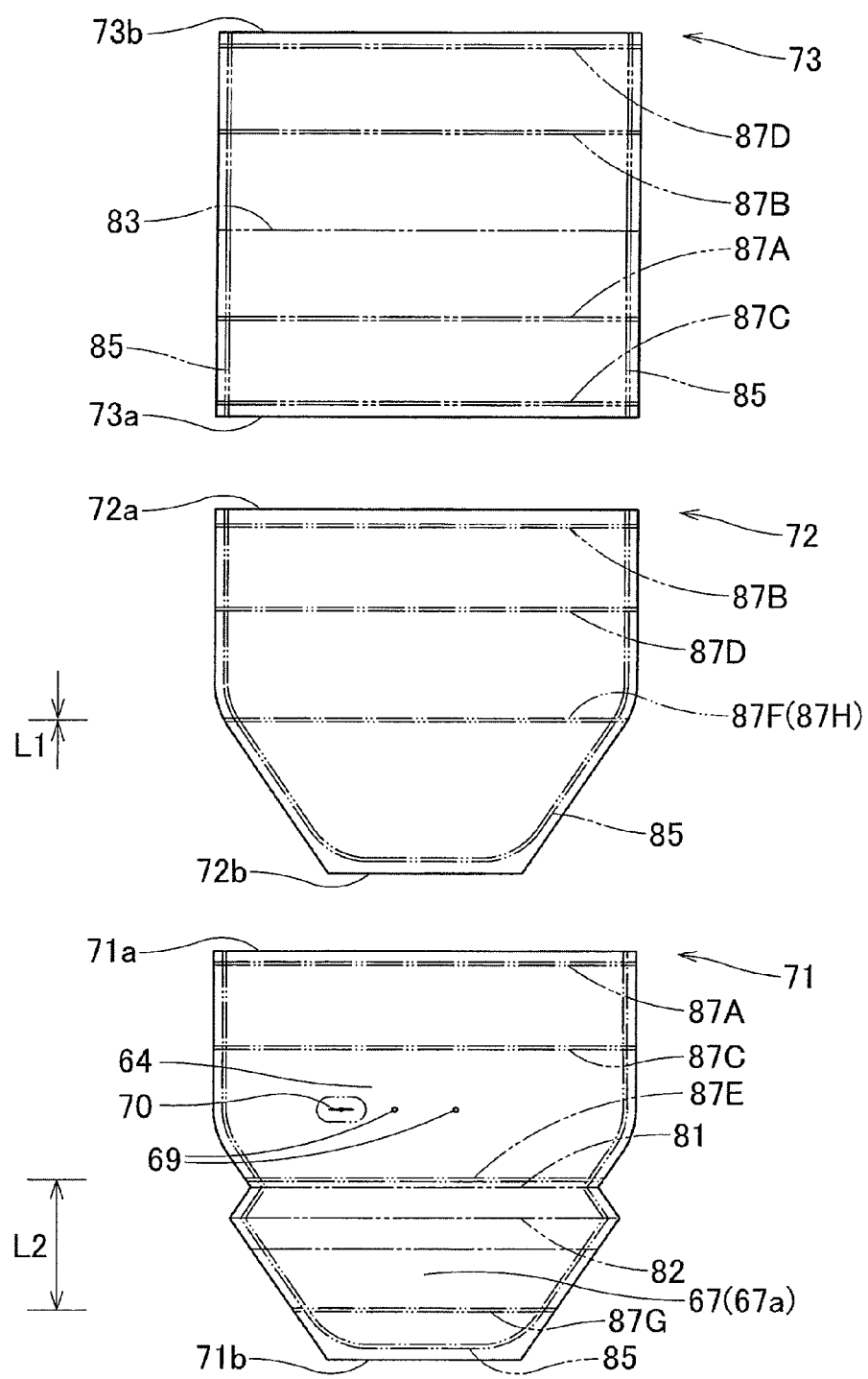
FIG. 6 is a plan view showing base materials that make up a circumferential wall of the air bag shown in FIG. 3.

In the air bag 51 of this embodiment, as shown in FIGS. 4 to 6, an abutment portion 67 is formed at a portion on the body side wall portion 66 that lies between the connected portions where the upper tether 55 and the lower tether 56 are connected to the body side wall portion 66. As shown in FIG. 9, this abutment portion 67 is disposed so as to project to the front of the body side wall portion 66 when the air bag 51 inflates completely and is brought into abutment with the instrument panel 11A. As shown in FIGS. 4, 5, a tack-like extra fabric portion 68 is provided on the body side wall portion 66 at the abutment portion 67. In the body side wall portion 66, the sides along the front edges (the front ends) 55a, 56a of the upper tether 55 and the lower tether 56 are stitched to upper and lower end sides of the area of the extra fabric portion 68, respectively, whereby the abutment portion 67 is made of the fabric area lying between the two stitched portions 87E, 87G.

In the air bag 51 of this embodiment, as shown in FIG. 9, the lower tether 56 of the air bag 51 is provided so that in relation to lengths from the stitched portion 85 of the body side wall portion 66 and the occupant side wall portion 65 which makes up the lower edge 51b of the air bag 51 when the air bag inflates completely to the connected portions where the lower tether 56 is stitched to the body side wall portion 66 and the occupant side wall portion 65, a length L6 on the side of the occupant side wall portion 65 (a length between the stitched portion 85 and the stitched portion 87H) is longer than a length L5 on the side of the body side wall portion 66 (a length between the stitched portion 85 and the stitched portion 87G).

In the air bag 51, the two tethers 53, 54 are provided one above the other in an up-to-down direction within the upper inflating portion 62 so that the tethers 53, 54 connect the body side wall portion 66 and the occupant side wall portion 65 together so as to control the thickness of the upper inflating portion 62 when it inflates completely, while being provided to extend substantially along the left-to-right direction. Additionally, the two tethers 55, 56 are provided one above the other in the up-to-down direction within the lower inflating portion 63 so that the tethers 55, 56 connect the body side wall portion 66 and the occupant side wall portion 65 together so as to control the thickness of the lower inflating portion 63 when it inflates completely, while being provided to extend substantially along the left-to-right direction.

Then, the air bag 51 is divided into five chambers 57 by the tethers 53, 54, 55, 56 which are the tethers 52, whereby chambers 57A, 57B, 57C, 57D, 57E are formed. An upper half portion made up of the chamber 57A, the chamber 57B and an upper half of the chamber 57C makes up the upper inflating portion 62, while a lower half of the chamber 57C, the chamber 57D and the chamber 57E makes up the lower inflating portion 63.

The air bag 51 is formed into the bag shape by cutting a base fabric made of polyester or polyamide fibers into predetermined patterns or shapes and sewing the fabrics cut to the predetermined shapes together with a stitching thread. In the case of this embodiment, as shown in FIGS. 6, 7, the air bag 51 is made up of three main body base fabrics 71, 72, 73 that make up the body side wall portion 66 and the occupant side wall portion 65 that make up, in turn, the circumferential wall 60 of the air bag 51 and four tether base fabrics 75, 76, 77, 78.

The main body base fabric 71 makes up a region on the body side wall portion 66 that extends from the lower edge 51b of the air bag 51 to an area on the upper inflating portion 62 where the tethers 53, 54 are disposed (an area below the tether 53). The main body base fabric 71 includes a portion 67a that makes up the abutment portion 67 on a lower side thereof. The main body base fabric 72 makes up a region on the occupant side wall portion 65 that extends from the lower edge 51b of the air bag 51 to an area on the upper inflating portion 62 where the tethers 53, 54 are disposed (an area below the tether 53). The main body base fabric 73 makes up the body side wall portion 66 and the occupant side wall portion 65 on a region on the upper inflating portion 62 that lies above the tether 53. The individual tether base fabrics 75, 75, 77, 75 are folded into two to make up the tether 53, the tether 54, the upper tether 55, and the lower tether 56, respectively. The tethers 75, 76, 77, 78 have openings 75a, 76a, 77a, 78a that make up the gas passage holes 53g, 54g, 55g, 56g, respectively.

In fabricating the air bag 51, a folding portion 83 on the main body base fabric 73 that makes up an upper edge 51a of the air bag 51 is folded so that the folding portion 83 is made into a ridge. The front edge 53a of the tether 53 and an upper edge 71a of the main body base fabric 71 are stitched together in a position on a front edge 73a side of the main body base fabric 73 where the chamber 57A is separated from the chamber 57B to form a stitched portion 87A. The rear edge 53b of the tether 53 and an upper edge 72a of the main body base fabric 72 are stitched together in a position on a rear edge 73b side of the main body base fabric 73 where the chamber 57A is separated from the chamber 57B to form a stitched portion 87B. The front edge 54a of the tether 54 and the main body base fabric 71 are stitched together in a position on the front edge 73a side of the main body base fabric 73 where the chamber 57B is separated from the chamber 57C to form a stitched portion 87C. The rear edge 54b of the tether 54 and the main body base fabric 72 are stitched together in a position on the rear edge 73b side of the main body base fabric 73 where the chamber 57B is separated from the chamber 57C (in a position along the rear edge 73b of the main body case fabric 73) to form a stitched portion 87D. The tethers 53, 54 are disposed in such a way that the joint portions to the occupant side wall portion 65 of the tethers 53, 54 are positioned upper than the joint portions to the body side wall portion 66 of the tethers 53, 54 so that the tethers 53, 54 extend substantially along the horizontal direction (refer to FIG. 8) when the air bag 51 inflates completely.

Thereafter, as shown in FIGS. 4, 6, 7, the front edge 55a of the upper tether 55 is stitched to a position on the main body base fabric 71 where the chamber 57C is separated from the chamber 57D to form the stitched portion 87E. The front edge 56a of the lower tether 56 is stitched to a position on the main body base fabric 71 where the chamber 57D is separated from the chamber 57E to form the stitched portion 87G. The rear edge 55b of the upper tether 55 and the rear edge 56b of the lower tether 56 are stitched to a position on the main body base fabric 72 where the chamber 57C is separated from the chamber 57D and a position on the main body base fabric 72 where the chamber 57D is separated from the chamber 57E (these positions are identical in FIG. 4) to form the stitched portion 87F (87h).

Following this, as shown in FIG. 3, the main body base fabrics 71, 72, 73 are overlapped, and left and right edges of the main body base fabrics 71, 72, 73, that is, edge portions that make up a left edge 51c, the lower edge 51b, and a right edge 51d of the air bag 51 are stitched together to thereby form the stitched portion 85. As this occurs, as shown in FIGS. 4, 6, a portion on a lower edge 71b side of the main body base fabric 71 which corresponds to the abutment portion 67 are folded twice in opposite directions so that the folded portions make up a groove 81 and a ridge 82 to thereby form the tack, whereby the extra fabric portion 68 is provided. This enables the upper tether 55 and the lower tether 56 of the air bag 51 to be provided so that the body side wall portion fabric length L2 that is the lengthwise dimension of the body side wall portion 66 between the connected portions to the body side wall portion 66 (between the stitched portion 87E and the stitched portion 87G) becomes longer than the occupant side wall portion fabric length L1 that is the lengthwise dimension of the occupant side wall portion 65 between the connected portions to the occupant side wall portion 65 (between the stitched portion 87F and the stitched portion 87H).

Next, the mounting of the knee protecting air bag system S of this embodiment on the vehicle will be described. Firstly, the inflator 41 is housed in the interior of the air bag 51 by inserting the main body portion 43 from the inserting hole 70 so that the connecting opening portion, not shown, is exposed and causing the mounting bolts 45 to project from the mounting holes 69. Thereafter, the air bag 51 is folded down to such a size that enables the air bag 51 to be housed in the case 21. In addition, the air bag 51 is folded down to such a size that enables the air bag 51 to be housed in the case 21 so that air bag smoothly enters the space defined between the knees K of the occupant MP and the body side member 11 when the air bag 51 deploys to inflate. Specifically, the upper inflating portion 62 of the air bag 51 is folded down to an upper side of the mounting portion 64 in such a way as to be wound from the upper edge 51a towards the body side wall portion 66. The lower inflating portion 63 is folded down to a lower side of the mounting portion 64 in such a way as to be wound from the lower edge 51b towards the body side wall portion 66. Thereafter, a left edge 51c side and a right edge 51d side of the air bag 51 are folded down to the vicinity of the mounting portion 64 in such a way as to be wound towards the occupant side wall portion 65. Then, a wrapping member is placed around the circumference of the air bag 51 so folded so as to wrap it. This wrapping member prevents the collapse of the folds made in the air bag 51 and can be broken when the air bag 51 deploys to inflate.

Next, the folded air bag 51 that houses the inflator 41 is housed in the case 21 so that the mounting bolts 45 of the inflator 41 projects from the case 21 by way of the mounting holes 69 of the air bag 51 and that the connecting opening portion of the inflator 41 is exposed from an opening, not shown, of the case 21. Nuts 49 are fastened to the mounting volts 45 to attach the air bag 51 and the inflator 41 to the case 21. Thereafter, the locking claw portions 24 of the case 21 are locked on the circumferential edges of the locking hole portions 13a that are formed in the mounting wall portion 13 of the air bag cover 12, whereby the air bag cover 12 is attached to the case 21. Thereafter, the case 21 is fixed to the instrument panel reinforcement of the vehicle by making use of the bracket, not shown, and the lead wire extending from the air bag activation circuit, not shown, is connected to the inflator 41, whereupon the knee protecting air bag system S can be mounted on the vehicle.

Next, the deployment and inflation of the air bag 51 will be described. After the knee protecting air bag system S is mounted on the vehicle, in case an activation signal is inputted to the inflator 41 by way of the lead wire, the inflation gas is let out from the gas outlet port 47 of the inflator 41, and the inflation gas flows into the air bag 51. Then, the air bag 51 inflates, breaks the wrapping material, not shown, pushes to open the door portion 15 of the air bag cover 12 and project from the air bag projecting opening 27 in the case 21. As this occurs, the upper door portion 15a opens rearwards and upwards on the upper hinge portion 17a as a fulcrum, while the lower door portion 15b opens rearwards and downwards on the lower hinge portion 17b as a fulcrum, whereby the door portion 15 is opened, this causing the air bag 51 to inflate to the rear of the instrument panel 11A. Then, as shown by the chain double-dashed lines in FIG. 1 and in FIG. 8, the upper inflating portion 62 of the air bag 51 deploys to inflate along the rear surface 11c extending from the rear, upper portion of the instrument panel 11A to the column cover 11B, while the lower inflating portion 63 of the air bag 51 deploys to inflate to the rear, lower portion, that is, the lower side 11b of the instrument panel 11A. To describe this in greater detail, the upper door portion 15a of the air bag cover 12 is folded rearwards and upwards through about 180 degrees on the upper hinge portion 17a as the fulcrum to be brought into abutment with the instrument panel 11A, and the upper inflating portion 62 inflates while in abutment with the rear of the upper door portion 15a. In addition, the lower door portion 15b is folded rearwards and downwards through about 180 degrees on the lower hinge portion 17b to be brought into abutment with the instrument panel 11A, and the lower inflating portion 63 inflates while in abutment with the rear of the lower door portion 15b.

In the knee protecting air bag system S of this embodiment, as shown in FIGS. 8, 9, when the air bag 51 deploys to inflate, the abutment portion 67 of the lower inflating portion 63 projects to the front to make up a point of application where the abutment portion 67 is brought into abutment with the instrument panel 11A via the lower door portion 15b. Then, the mounting portion 64 of the air bag 51 that is mounted in the case 21 makes up a fulcrum, and the upper inflating portion 62 of the air bag 51 presses against the instrument panel 11A as a point of action. The upper inflating portion 62 of the air bag 51 deploys to inflate along the rear surface 11c of the body side member 11 by means of the force that presses against the instrument panel 11A using the upper inflating portion 62 as the point of application, whereby the upper inflating portion 62 can be restrained from moving to the rear. In addition, since the upper inflating portion 62 of the air bag 51 deploys to inflate along a rear surface 11c side of the instrument panel 11A, even though a space between the knees K of the occupant MP and the body side member 11 is narrow, the upper inflating portion 62 of the air bag 51 can enter the narrow space smoothly. Additionally, since the upper inflating portion 62 of the air bag 51 that has deployed to inflate is in abutment with the rear surface 11c side of the instrument panel 11A, the knees K can be protected by ensuring a reaction force when the upper inflating portion 62 comes to bear the knees K.

Consequently, in the knee protecting air bag system S of this embodiment, when activated, the air bag 51 is allowed to deploy to inflate along the rear surface 11c side of the instrument panel 11A, and even though the space between the knees K of the occupant and the instrument panel 11A is narrow, the upper inflating portion 62 is allowed to enter the narrow space smoothly, and the knees K can be protected by ensuring the reaction force when the upper inflating portion 62 comes to bear the knees K.

Then, as shown in FIGS. 5, 6, in the knee protecting air bag system S of the embodiment, the upper tether 55 and the lower tether 56 are provided so that the body side wall portion fabric length L2 that is the lengthwise dimension of the body side wall portion 66 between the connected portions to the body side wall portion 66 (between the stitched portion 87E and the stitched portion 87G) becomes longer than the occupant side wall portion fabric length L1 that is the lengthwise dimension of the occupant side wall portion 65 between the connected portions to the occupant side wall portion 65 (between the stitched portion 87F and the stitched portion 87H).

Owing to this, in the embodiment, the abutment portion 67 can easily ensure the projecting amount to the front towards the body side member 11 by the difference in length between the fabric portion where the upper tether 55 and the lower tether 56 are connected to the occupant side wall portion 65 and the fabric portion where the upper tether 55 and the lower tether 56 are connected to the body side wall portion 66, whereby the upper inflating portion 62 is allowed to deploy to inflate along the rear surface 11c of the body side member 11.

In the knee protecting air bag system S of the embodiment, the portions where the upper tether 55 and the lower tether 56 of the air bag 51 are connected to the occupant side wall portion 65 (the stitched portion 87F and the stitched portion 87H) coincide with each other.

Owing to this, in this embodiment, the difference in length between the fabric portion where the upper tether 55 and the lower tether 56 are connected to the occupant side wall portion 65 and the fabric portion where the upper tether 55 and the lower tether 56 are connected to the body side wall portion 66 can be ensured to the maximum extent, thereby making it possible to ensure the maximum projecting amount of the abutment portion 67.

In the knee protecting air bag system S of the embodiment, the lower tether 56 is provided so that in relation to the lengths from the stitched portion 85 of the body side wall portion 66 and the occupant side wall portion 65 which makes up the lower edge 51b of the air bag 51 when the air bag inflates completely to the connected portions where the lower tether 56 is stitched to the body side wall portion 66 and the occupant side wall portion 65, the length L6 on the side of the occupant side wall portion 65 (the length between the stitched portion 85 and the stitched portion 87H) is longer than the length L5 on the side of the body side wall portion 66 (the length between the stitched portion 85 and the stitched portion 87G).

Owing to this, in the embodiment, since the length of the side of the occupant side wall portion 65 is longer than the length of the side of the body side wall portion 66 that lies between the lower tether 56 and the lower edge 51b, a tensile force that attempts to extend upwards from the lower edge 51b as a boundary portion when the air bag 51 inflates completely becomes greater on the side of the occupant side wall portion 65 than on the side of the body side wall portion 66, whereby an action to push forwards an upper end side of the upper inflating portion 62 of the air bag 51 can be promoted, and this makes it easier for the upper inflating portion 62 of the air bag 51 to deploy to inflate along the rear surface of the body side wall portion 66. Thus, even though the space between the body side member 11 and the knees K of the occupant is narrow, the upper inflating portion 62 of the air bag 51 can enter the narrow space smoothly.

In the air bag 51 of the embodiment, the lower inflating portion 63 is divided into the two chambers by the upper tether 55 and the lower tether 56 that are connected to the inner circumferential side of the air bag 51 along the full circumferences of outer circumferential edges thereof. Owing to this, in the event that the two chambers 57D, 57E that are formed on the lower side of the air bag 51 (the chamber 57D formed between the upper tether 55 and the lower tether 56 and the chamber 57E formed from the lower tether 56 to the lower edge side of the air bag 51) inflate, the internal pressures of the two chambers 57D, 57E are increased to thereby make the two chambers 57D, 57E into rigid bodies, whereby the increased internal pressures can be maintained. Then, the force attempting to cause the abutment portion 67 of the chamber 57D to project forwards towards the body side member 11 is exerted on the abutment portion 67 and the force attempting to push the chamber 57D is exerted on the chamber 57D due to the difference in lengthwise dimension between the fabric portion where the upper tether 55 and the lower tether 56 are connected to the occupant side wall portion 65 and the fabric portion where the upper tether 55 and the lower tether 56 are connected to the body side wall portion 66, whereby the abutment portion 67 of the air bag 51 can be brought into abutment with the lower side 11b of the instrument panel 11A for stable support thereon. Then, the mounting portion 64 makes up a fulcrum, and the upper inflating portion 62 of the air bag 51 can be deployed to inflate along the lower surface 11c of the instrument panel 11A in a stable fashion.

In this embodiment, the chamber 57E provides the area corresponding to the length L5 below the lower tether 56 on the side of the body side wall portion 66. However, as with an air bag 51A shown in FIGS. 10, 11, the lower tether 56 may be provided so that the portion where the lower tether 56 is connected to the body side wall portion 66 coincides with the boundary portion between the body side wall portion 66 and the occupant side wall portion 65 which is now situated at the lower edge 51b of the air bag 51. In the air bag MA, a chamber 57E provides no portion that inflates freely below a lower tether 56 on a body side wall portion 66, and a tensile force attempting to extend upwards from a boundary portion when the air bag 51 deploys to inflate can be ensured only on the side of an occupant side wall portion 65 below the lower tether 56. Thus, the force attempting to push forwards an upper end of an upper inflating portion 62 of the air bag 51A can easily be ensured in a stable fashion.

In the embodiment, the knee protecting air bag system S is described as being disposed in the portion of the instrument panel facing the driver's seat. However, the knee protecting air bag system S may be disposed in a portion of the instrument panel facing a front passenger's seat.

Figure 10:
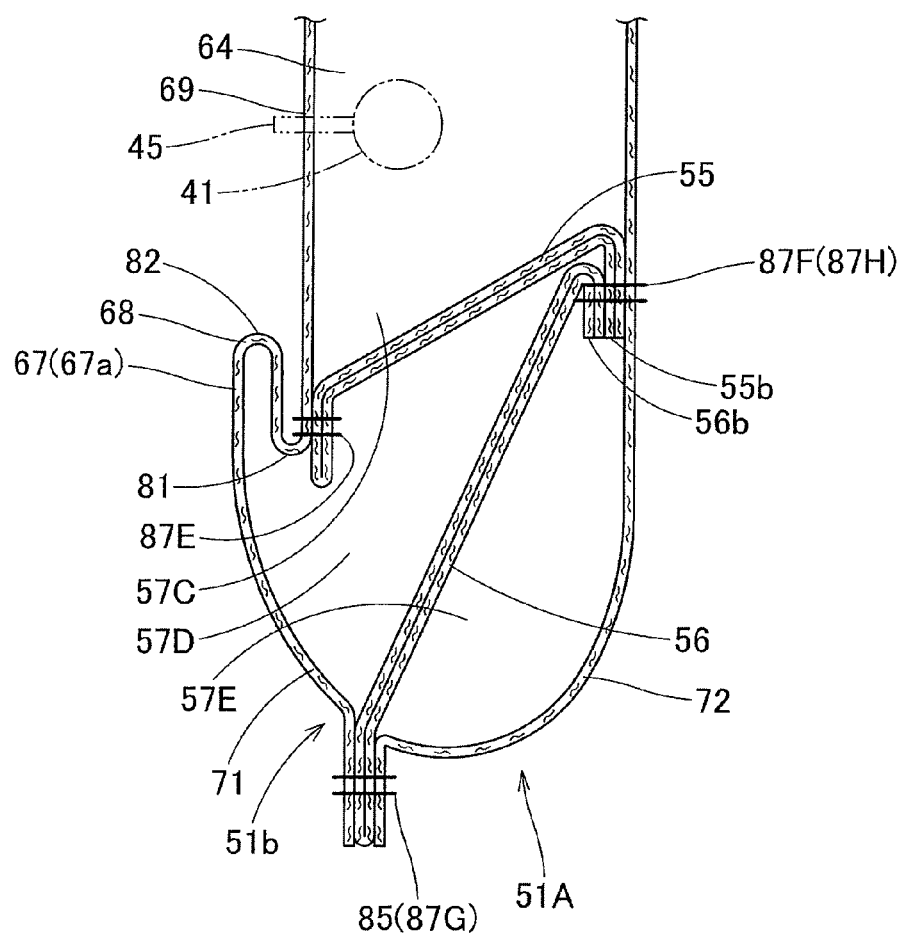
FIG. 10 is a partial enlarged view showing a portion of an air bag according to another embodiment where a lower inflating portion is provided.
Figure 11:
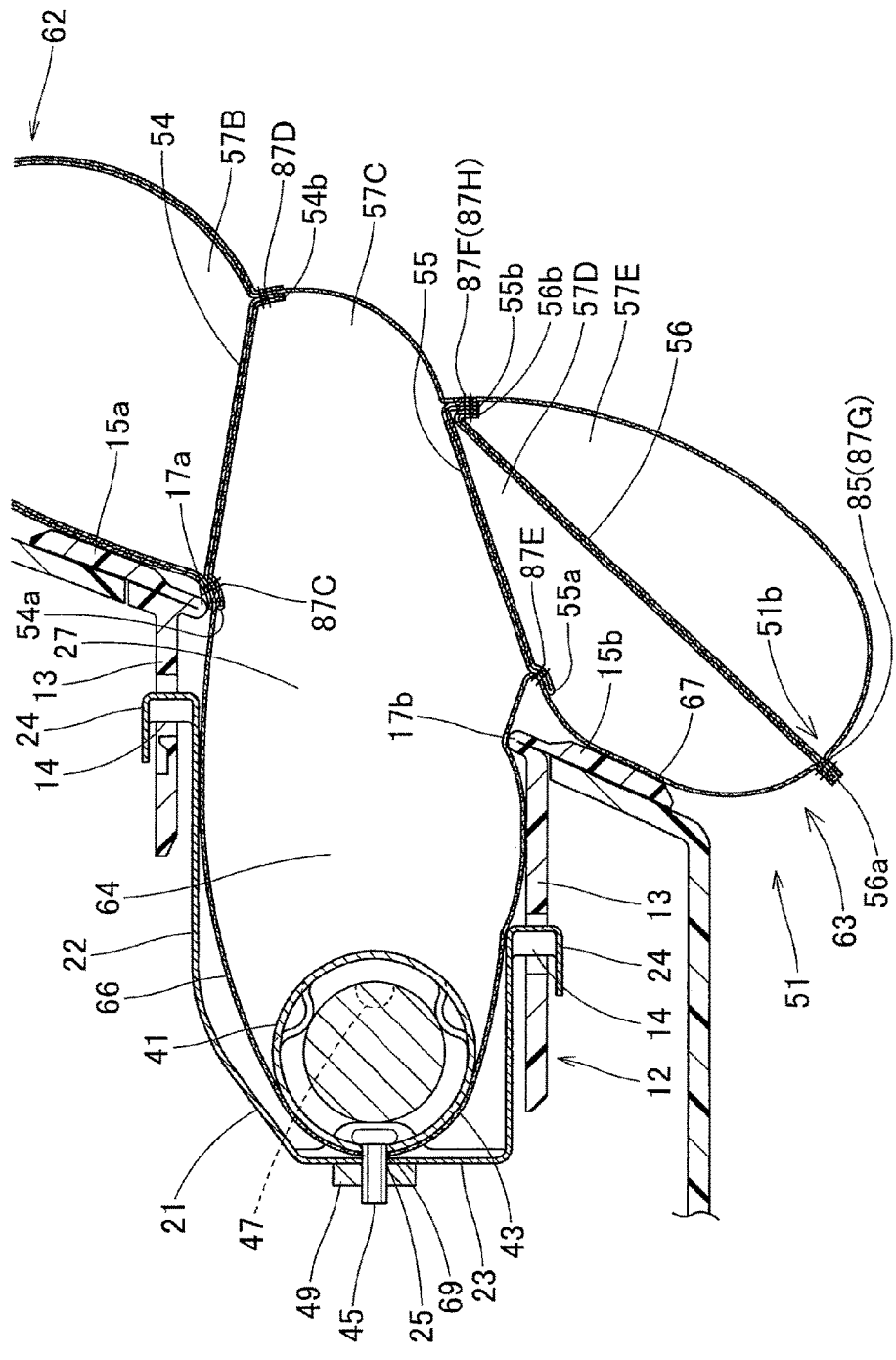
FIG. 11 is a schematic vertical sectional view of the knee protecting air bag system with the air bag shown in FIG. 10 inflated taken along the front-to-rear direction of the vehicle and is more particularly a partial enlarged view showing the portion of the air bag where the lower inflating portion is provided.
Figure 12:
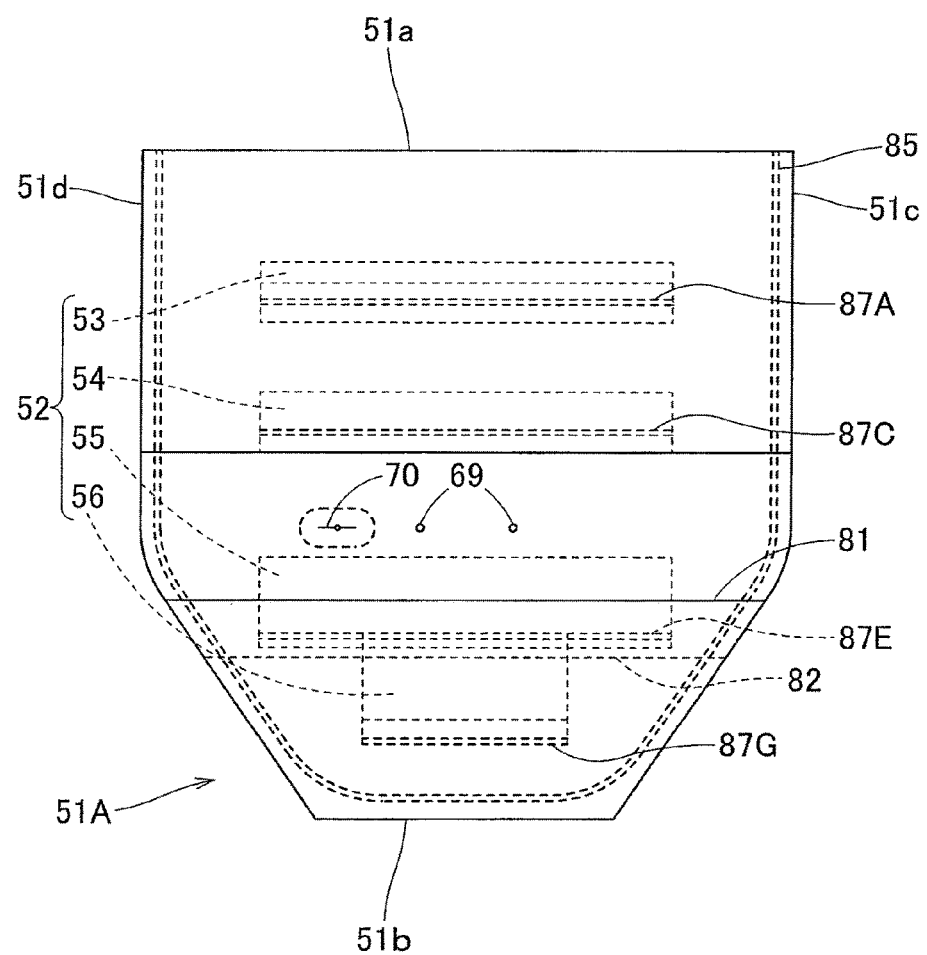
FIG. 12 is a rear view of the air bag shown in FIG. 10.

In the knee protecting air bag system S of the embodiment, the tethers 52 are described as being provided so as to be connected to the circumferential wall 60 of the air bag 51 along the full circumferences of the outer circumferential edges thereof. However, as with the air bag 51A shown in FIGS. 10 to 12, the tethers 52 may be provided so as not to extend as far as both left and right edges (a left edge 51c, a right edge 51d) of the air bag 51A in order to provide inflation gas flow paths on both end edges of the tethers 52. In FIGS. 10 to 12, no gas passage holes are provided in the tethers 52, however, the tethers 52 may, of course, include gas passage holes.

Further, in the knee protecting air bag system S of the embodiment, the extra fabric portion 68 is provided on the abutment portion 67. However, in place of providing the extra fabric portion 68, a difference in fabric length may be provided.

In relation to the position where the upper tether 56 of the air bag 51 is connected to the body side wall portion 66 (the stitched portion 87E), as shown in FIG. 9, it is desirable that the upper tether 55 connects to the body side wall portion 66 near the vicinity of the lower edge of the air bag projecting opening 27 below the case 21 as the housing portion when the air bag 51 inflates completely. This is because the abutment portion 67 is allowed to be brought into contact with the rear surface 11*c* of the instrument panel 11A below the case 21 within the small space. Then, as this occurs, although the front edge 56*a* of the lower tether 56 is connected to the body side wall portion 66 at the stitched portion 87G below the position where the front edge 55*a* of the upper tether 55 is connected to the body side wall portion 66 (the stitched portion 87E), in case the position where the rear edge 56*b* of the lower tether 56 is connected to the occupant side wall portion 65 (the stitched portion 87H) is such that the rear edge 56*b* of the lower tether 56 is connected to the occupant side wall portion 65 as upwards of the height position (the stitched portion 87E) of the front edge 55*a* of the upper tether 55 as possible with the air bag 51 having inflated completely, the front edge 56*a* of the lower tether 56 is pulled upwards on the side of the front edge 55*a* of the upper tether 55 when the air bag 51 inflates completely, whereby when inflated, the abutment portion 67 is allowed to project to the rear easily. Owing to this, it is desirable that the portion where the rear edge 56*b* of the lower tether 56 is connected to the occupant side wall portion 65 (the stitched portion 87H) is disposed, as shown in FIG. 9, in a higher (upper) position than the height position of the front edge 55*a* of the upper tether 55 (the stitched portion 87E), in other words, so as to enter the area lying to the rear of the air bag projecting opening 27. In this embodiment, the rear edge 55*b* of the upper tether 55 is connected to the occupant side wall portion 65 at the stitched portion 87H so as to coincide with the height position of the front edge 55*a* of the upper tether 55 (the position where the rear edge 55*b* of the upper tether 55 is connected to the body side wall portion 66 (the stitched portion 87E)). This configuration is desirable in ensuring the shape of the abutment portion 67 in which the abutment portion 67 projects to the front while being curved.

What is claimed is:

1. A knee protecting air bag system comprising
an air bag that is folded to be housed in a housing portion on a lower side of a body side member in front of a seated occupant, the air bag including:
   an occupant side wall portion that is disposed on a side facing the occupant and a body side wall portion that is disposed on a side facing the body side member when the air bag deploys to inflate to a rear from the housing portion by inflation gas being caused to flow thereinto;
   an upper inflating portion that deploys to inflate on an upper side of the housing portion so as to protect knees of the occupant;
   a lower inflating portion that is disposed at the rear of the body side member on a lower side of the housing portion;
   a mounting portion that is provided on a lower side of the body side wall portion so as to be mounted in the housing portion; and
   a plurality of thickness controlling tethers that are provided so as to connect the occupant side wall portion and the body side wall portion when the air bag inflates completely, wherein:
   the plurality of thickness controlling tethers includes an upper tether and a lower tether that are provided to extend into a belt-like shape along a left-to-right direction in upper and lower positions in the lower inflating portion when the air bag inflates completely and which are connected to the body side wall portion at front end sides and are connected to the occupant side wall portion at rear end sides thereof;
   an abutment portion that is formed between a portion where the upper tether is connected to the body side wall portion and a portion where the lower tether is connected to the body side wall portion so as not only to project to the front when the air bag inflates completely but also to be brought into abutment with a rear surface of the body side member to thereby restrain an upper end side of the upper inflating portion from moving to the rear when the air bag inflates completely; and
   the upper tether and the lower tether of the air bag are provided so that a lengthwise dimension of the body side wall portion between a portion where the upper tether is connected to the body side wall and a portion where the lower tether is connected to the body side wall portion is longer than a lengthwise dimension of the occupant side wall portion between a portion where the upper tether is connected to the occupant side wall portion and a portion where the lower tether is connected to the occupant side wall portion.

2. The knee protecting air bag system according to claim 1, wherein
the upper tether and the lower tether of the air bag are provided so that a portion where the upper tether is connected to the occupant side wall portion coincides with a portion where the lower tether is connected to the occupant side wall portion.

3. The knee protecting air bag system according to claim 1, wherein
the lower tether of the air bag is provided so that in relation to lengths from a boundary portion between the body side wall portion and the occupant side wall portion which lies on a lower edge side of the air bag when the air bag inflates completely to portions where the lower tether is connected to the body side wall portion and the occupant side wall portion, a length on the side of the occupant side wall portion is longer than a length on the side of the body side wall portion.

4. The knee protecting air bag system according to claim 1, wherein
the lower tether of the air bag is provided so that the portion where the lower tether is connected to the body side wall portion coincides with the boundary portion between the body side wall portion and the occupant side wall portion which lies on the lower edge side of the air bag when the air bag inflates completely.

5. The knee protecting air bag system according to claim 1, wherein the upper tether and the lower tether of the air bag are provided so that the upper tether and the lower tether each have an opening through which inflation gas can pass and that the upper tether and the lower tether are connected to an inner circumferential side of the air bag along full circumferences of outer circumferential edges thereof.

6. The knee protecting air bag system according to claim 1, wherein the body side wall portion of the air bag is formed so that in relation to a lengthwise dimension, between a portion where the upper tether is connected to the body side wall portion and a portion where the lower tether is connected to the body side wall portion, a central portion in a left-to-right direction is longer than left and right edge sides.

7. A knee protecting air bag system comprising
an air bag that is folded to be housed in a housing portion on a lower side of a body side member in front of a seated occupant, the air bag including:
an occupant side wall portion that is disposed on a side facing the occupant and a body side wall portion that is disposed on a side facing the body side member when the air bag deploys to inflate to a rear from the housing portion by inflation gas being caused to flow thereinto;
an upper inflating portion that deploys to inflate on an upper side of the housing portion so as to protect knees of the occupant;
a lower inflating portion that is disposed at the rear of the body side member on a lower side of the housing portion;
a mounting portion that is provided on a lower side of the body side wall portion so as to be mounted in the housing portion; and
a plurality of thickness controlling tethers that are provided so as to connect the occupant side wall portion and the body side wall portion when the air bag inflates completely, wherein:
the plurality of thickness controlling tethers includes an upper tether and a lower tether that are provided to extend into a belt-like shape along a left-to-right direction in upper and lower positions in the lower inflating portion when the air bag inflates completely and which are connected to the body side wall portion at front end sides and are connected to the occupant side wall portion at rear end sides thereof;
an abutment portion that is formed between a portion where the upper tether is connected to the body side wall portion and a portion where the lower tether is connected to the body side wall portion so as not only to project to the front when the air bag inflates completely but also to be brought into abutment with a rear surface of the body side member to thereby restrain an upper end side of the upper inflating portion from moving to the rear when the air bag inflates completely; and
the lower tether of the air bag is provided so that the portion where the lower tether is connected to the body side wall portion coincides with the boundary portion between the body side wall portion and the occupant side wall portion which lies on the lower edge side of the air bag when the air bag inflates completely.

8. The knee protecting air bag system according to claim 7, wherein
the upper tether and the lower tether of the air bag are provided so that a lengthwise dimension of the body side wall portion between a portion where the upper tether is connected to the body side wall and a portion where the lower tether is connected to the body side wall portion is longer than a lengthwise dimension of the occupant side wall portion between a portion where the upper tether is connected to the occupant side wall portion and a portion where the lower tether is connected to the occupant side wall portion; and
the upper tether and the lower tether of the air bag are provided so that a portion where the upper tether is connected to the occupant side wall portion coincides with a portion where the lower tether is connected to the occupant side wall portion.

9. The knee protecting air bag system according to claim 7, wherein
the lower tether of the air bag is provided so that in relation to lengths from a boundary portion between the body side wall portion and the occupant side wall portion which lies on a lower edge side of the air bag when the air bag inflates completely to portions where the lower tether is connected to the body side wall portion and the occupant side wall portion, a length on the side of the occupant side wall portion is longer than a length on the side of the body side wall portion.

10. The knee protecting air bag system according to claim 7, wherein
the upper tether and the lower tether of the air bag are provided so that the upper tether and the lower tether each have an opening through which inflation gas can pass and that the upper tether and the lower tether are connected to an inner circumferential side of the air bag along full circumferences of outer circumferential edges thereof.

11. The knee protecting air bag system according to claim 7, wherein the body side wall portion of the air bag is formed so that in relation to a lengthwise dimension, between a portion where the upper tether is connected to the body side wall portion and a portion where the lower tether is connected to the body side wall portion, a central portion in a left-to-right direction is longer than left and right edge sides.

* * * * *